(12) United States Patent
Lee et al.

(10) Patent No.: US 6,631,385 B2
(45) Date of Patent: Oct. 7, 2003

(54) EFFICIENT RECOVERY METHOD FOR HIGH-DIMENSIONAL INDEX STRUCTURE EMPLOYING REINSERT OPERATION

(75) Inventors: Jang Sun Lee, Taejon (KR); June Kim, Taejon (KR); Hun Soon Lee, Ohkchon-Koon (KR); Myung Joon Kim, Taejon (KR); Gil Rok Oh, Seoul (KR); Jae Soo Yoo, Chungju-shi (KR); Seok Il Song, Chungju-shi (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/497,136

(22) Filed: Feb. 3, 2000

(65) Prior Publication Data

US 2003/0079157 A1 Apr. 24, 2003

(30) Foreign Application Priority Data

Dec. 24, 1999 (KR) .......... 1999-61940

(51) Int. Cl.[7] .............................. G06F 17/30
(52) U.S. Cl. ........................... 707/202; 707/3
(58) Field of Search ............. 707/102, 2, 100, 707/200, 201, 202, 5, 8, 10

(56) References Cited

U.S. PATENT DOCUMENTS

| | | | |
|---|---|---|---|
| 5,717,921 A | | 2/1998 | Lomet et al. .............. 707/100 |
| 5,758,356 A | * | 5/1998 | Hara et al. ................. 707/202 |
| 5,799,300 A | * | 8/1998 | Agrawal et al. ............... 707/5 |
| 5,956,705 A | * | 9/1999 | Stevens et al. ................ 707/2 |
| 6,026,406 A | * | 2/2000 | Huang et al. ............... 707/100 |
| 6,282,546 B1 | * | 8/2001 | Gleichauf et al. .......... 707/102 |
| 6,374,235 B1 | * | 4/2002 | Chen et al. ................... 707/2 |
| 6,397,204 B1 | * | 5/2002 | Liu et al. ..................... 707/2 |

OTHER PUBLICATIONS

Kornacker, et al.; *High–Concurrency Locking in R–Trees*; 1995; Proceedings of the 21st VLDB Conference, Zurich, Switzerland.
Kornacker, et al; *Concurrency and Recovery in Generalized Search Trees*.

* cited by examiner

Primary Examiner—Diane D. Mizrahi
(74) Attorney, Agent, or Firm—Jacobson Holman PLLC

(57) ABSTRACT

A recovery method for a high-dimensional index structure is disclosed, in which a reinsert operation is employed based on ARIES (algorithm for recovery and isolation exploiting semantics) and a page-oriented redo and a logical undo. Further, a recording medium on which a program for carrying out the above method is recorded is disclosed, the program being readable by a computer. The recovery method for a high-dimensional index structure employing a reinsert operation according to the present invention includes the following steps. At a first step, an entry is inserted into a node, a minimum bounding region is adjusted, an overflow is processed, and a log record is stored. At a second step, the log record thus stored is recovered.

8 Claims, 6 Drawing Sheets

EFFICIENT RECOVERY METHOD FOR HIGH-DIMENSIONAL INDEX STRUCTURE EMPLOYING REINSERT OPERATION

FIELD OF THE INVENTION

The present invention relates to a recovery method for a high-dimensional index structure; and more particularly, to a recovery method for a high-dimensional index structure employing a reinsert operation, and also relates to a recording medium on which a program for carrying out the above method is recorded, the program being readable by a computer.

DESCRIPTION OF THE PRIOR ART

In the conventional recovery method for a high dimensional index structure, basically, a page oriented redo and a logical undo are carried out based on the WAL (write ahead logging) protocol. The logical undo refers to a method in which when carrying out the undo operation, the index structure is opened and traversed from the root. Thus the node is found out, and then, the undo operation is carried out at the found node. In the page-oriented redo, the index structure is not opened, and the redo operation is carried out at the node which is recorded in the log record.

In a recovery technique which is shown in the $R^{link}$-tree, there are separately handled: a content modification operation which carry out an insert/delete of an entry to/from a leaf node; and a tree structure modification operation(SMO) which carry out a split of node, a deletion of node, or a minimum bounding region(MBR) alteration of non-leaf node. The modification of the leaf node due to the entry insertion or deletion is undone if the transaction is rolled back, while it is redone if the transaction is completed.

On the other hand, the SMO is treated as an Atomic Action which is a separate recoverable unit, thereby excluding the dependencies which occur when the recovery is performed among the transactions. And even if the transactions are not completed, other transactions are made to see this alteration. That is, the pages which have participated in the SMO are not required to be locked until the transaction is completed.

Researches on the framework by which the index structure based on GIST (generalized search tree) can be easily developed are being carried out. In this method also, a concurrency control technique and a recovery technique are proposed. The recovery technique presented here is also based on the WAL protocol, and is also based on the page-oriented redo and the logical undo.

Meanwhile, the modification operation is divided into two: a SMO including the node deletion and the modification of the MBR; and a simple modification operation.

However, unlike the method of the $R^{link}$-tree, the SMO is handled in the form of NTA (nested top action). The greatest difference lies in the following fact. That is, the SMO in the $R^{link}$-tree includes only the split of the leaf/non-leaf nodes. In the GIST, however, the SMO includes the other splits which can occur when the split contents of the leaf/non-leaf nodes are reflected on the upper node as well as the split of the leaf/non-leaf nodes.

In the above described recovery method for the conventional high dimensional index structure, the page-oriented redo and the logical undo are carried out based on the WAL protocol. The modification operations that occur in the index structure are classified into SMOs and general modification operations. The SMOs are handled as a NTA or an Atomic Action. If the SMO is completed, then other transactions are made to see this alteration, thereby improving the simultaneity. However, these recovery techniques do not present any method by which the reinsert operation can be carried out in an efficient manner. If this recovery method is applied to each of the reinsert operations, a lot of time is required to recover from the rollback of operation or the system failure.

SUMMARY OF THE INVENTION

Therefore, it is an object of the present invention to provide a recovery method for a high-dimensional index structure employing a reinsert operation which is based on ARIES (algorithm for recovery and isolation exploiting semantics) and a page oriented redo and a logical undo, and also to provide a recording medium on which a program for carrying out the above method is recorded, the program being readable by a computer.

In accordance with an aspect of the present invention, there is provided a method for recovering a high-dimensional index structure employing a reinsert operation, comprising the steps of: a) inserting an entry into a node, adjusting a MBR, processing an overflow, and storing a log record; and b) recovering the log record thus stored.

In accordance with another aspect of the present invention, there is provided a computer readable and executable recording medium having a program for performing a method for recovering a high-dimensional index structure, the method comprising the steps of: a) inserting an entry into a node, adjusting a minimum bounding region, processing an overflow, and storing a log record; and b) recovering the log record thus stored.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
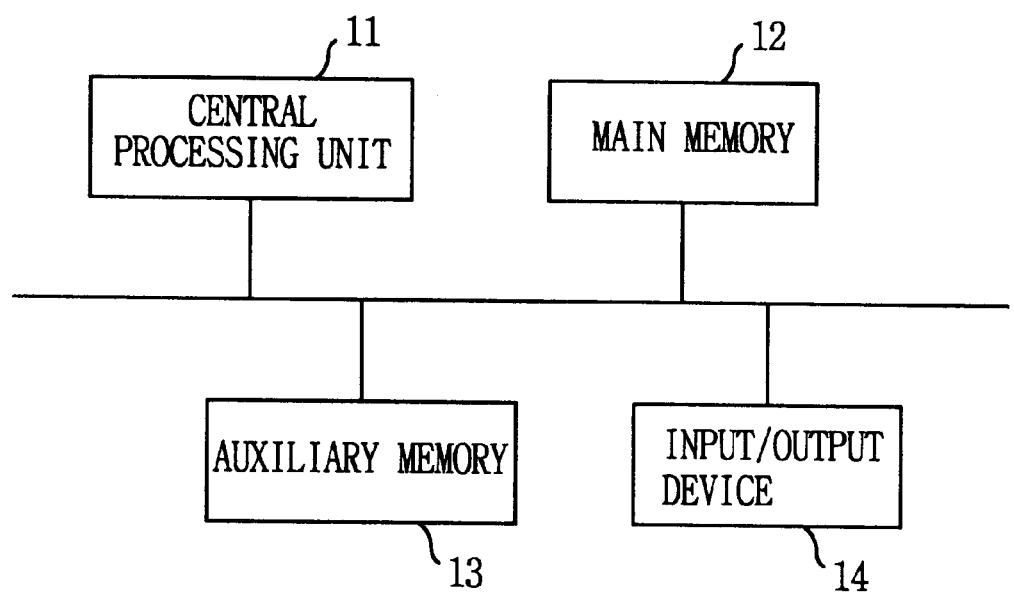
FIG. 1 is a block diagram of the recovery apparatus for a high-dimensional index structure carrying out a reinsert operation according to the present invention.

FIG. 1 illustrates a block diagram of the recovery apparatus for a high-dimensional index structure carrying out a reinsert operation according to the present invention.

As shown in FIG. 1, the recovery apparatus for a high-dimensional index structure carrying out a reinsert operation according to the present invention includes: a central processing unit 11 for controlling and managing the overall operations; a main memory 12 and an auxiliary memory 13 for storing programs for the central processing unit 11, and for storing various data; and an input/output device 14 for inputting and outputting data for the user.

The auxiliary memory 13 is capable of storing a large amount of data. The input/output device 14 includes a keyboard, a display device and a printer.

The above described computer hardware is widely known, and therefore, descriptions on it will be skipped here.

Now the recovery method for a high dimensional index structure carrying out a reinsert operation according to the present invention will be described.

Figure 2:
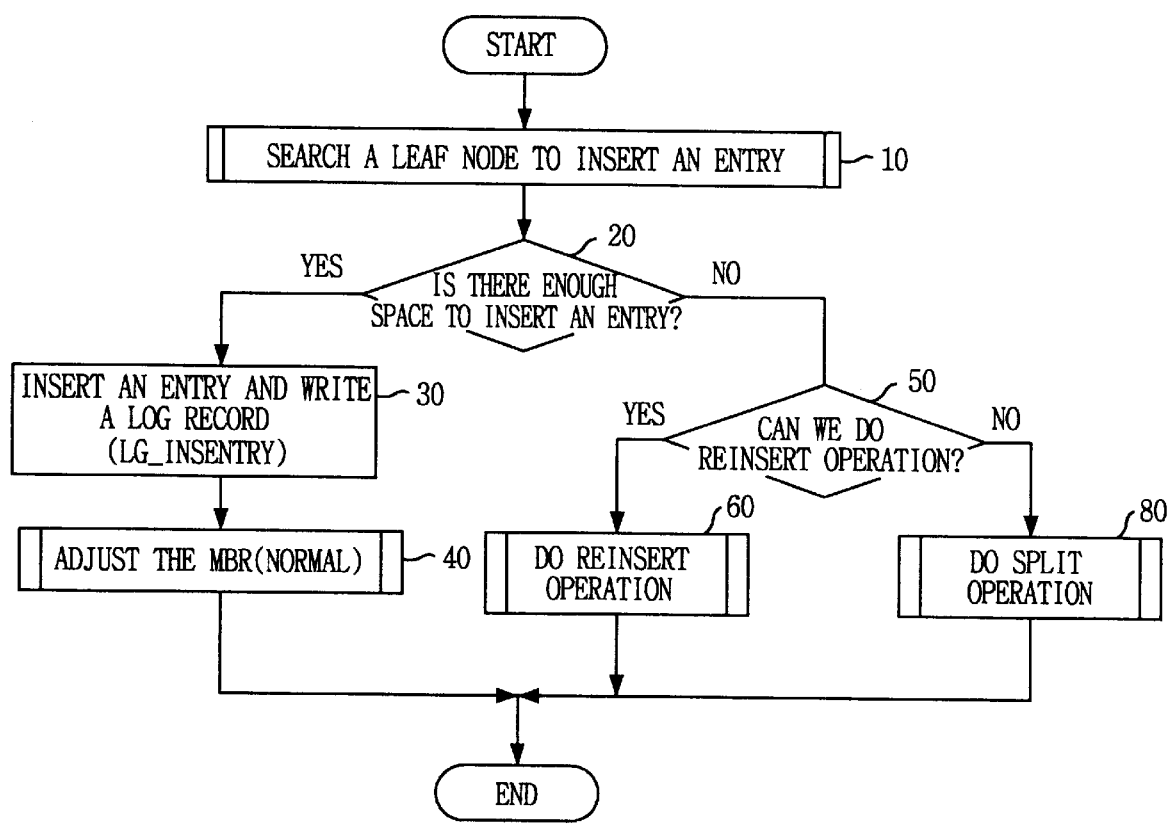
FIG. 2 is a flow chart showing the constitution of the insert operation according to the present invention.

FIG. 2 is a flow chart showing the constitution of the insert operation according to the present invention.

First, a traversing of the tree is carried out to find the leaf node in which a new entry can be inserted most properly at step 10. Then a checking is made as to whether there is sufficient space for inserting the new entry in the leaf node at step 20.

If there is enough space, a new entry is inserted at step 30, and then the MBR (minimum bounding region) is adjusted at step 40.

On the other hand, if there is no sufficient space, a judgment is made as to whether a reinsert operation can be done at step 50.

If it is positive, then a reinsert operation is carried out at step 60, while if it is negative, then the relevant node is split at step 80.

Figure 3:
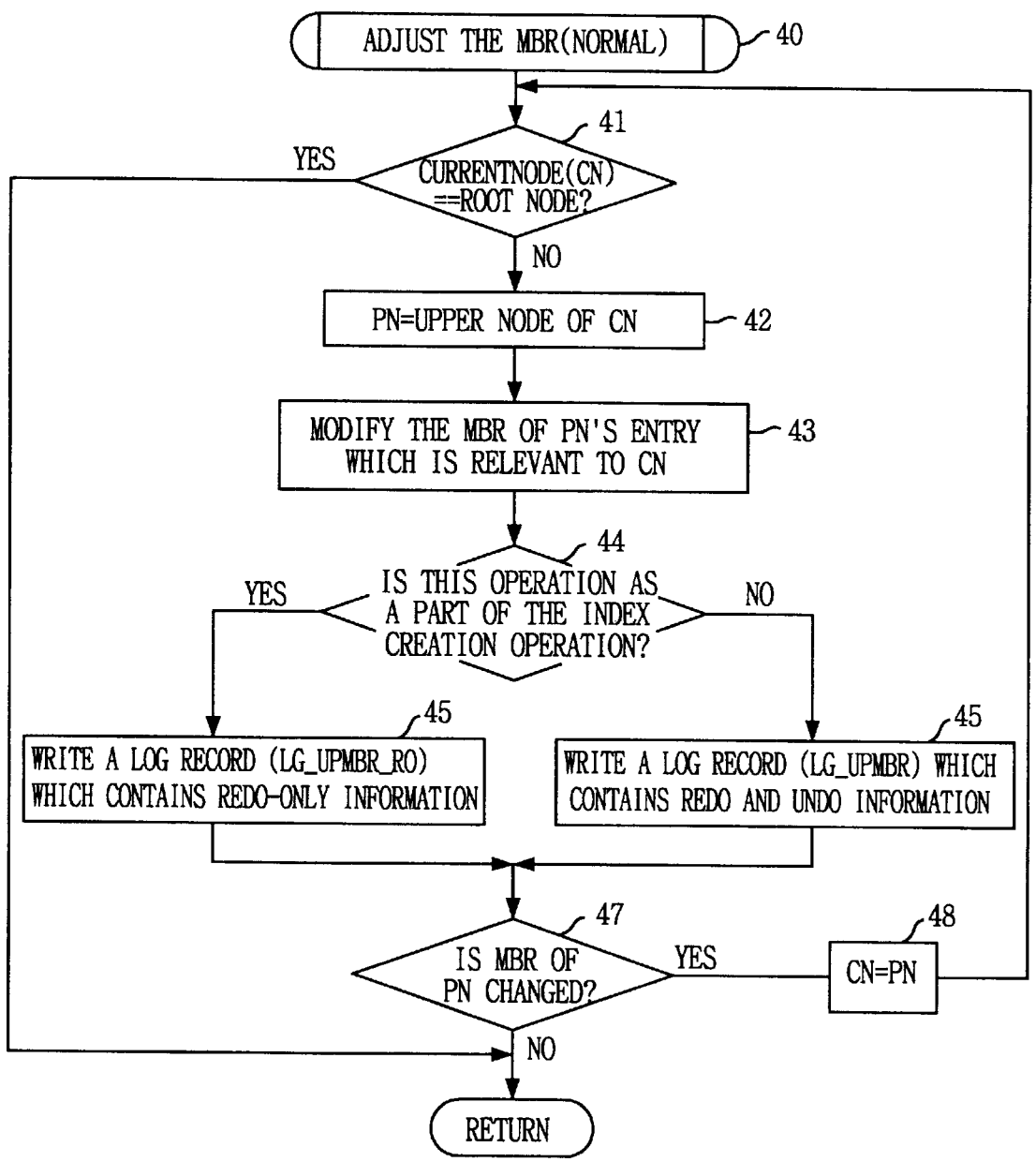
FIG. 3 is a flow chart showing a subroutine for adjusting the minimum bounding region of FIG. 2.

FIG. 3 is a flow chart showing a subroutine for adjusting the MBR of FIG. 2.

First, a judgment is made as to whether the current node is a root node at step 41.

If the current node is a root node, this means that the MBR has been adjusted, and therefore, the current node is returned. On the other hand, if not, then the upper node (parent node) is accessed at step 42 to alter the MBR of the relevant entry at step 43. Then a judgment is made as to whether a part of the index creation operation has been processed at step 44.

When the judgment of the step 44 is positive, then the log record(LG_UPMBR_RO) which has only redo information for modification of MBR is recorded at step 45. Then a judgment is made as to whether the MBR of the parent node of the current node has been altered at step 47.

On the other hand, when the judgment of the step 44 is negative, write a log record (LG_UPMBR) which has redo and undo information for modification of MBR at step 46. Then a judgment is made as to whether the MBR of the parent node of the current node has been altered at step 47.

If the MBR of the parent node has been altered, the current node is assigned to the parent node (current node= parent node) at step 48 and then a judgment is made as to whether the current node is a root node at step 41. It the MBR of the parent node has not been altered, then it is returned.

Figure 4:
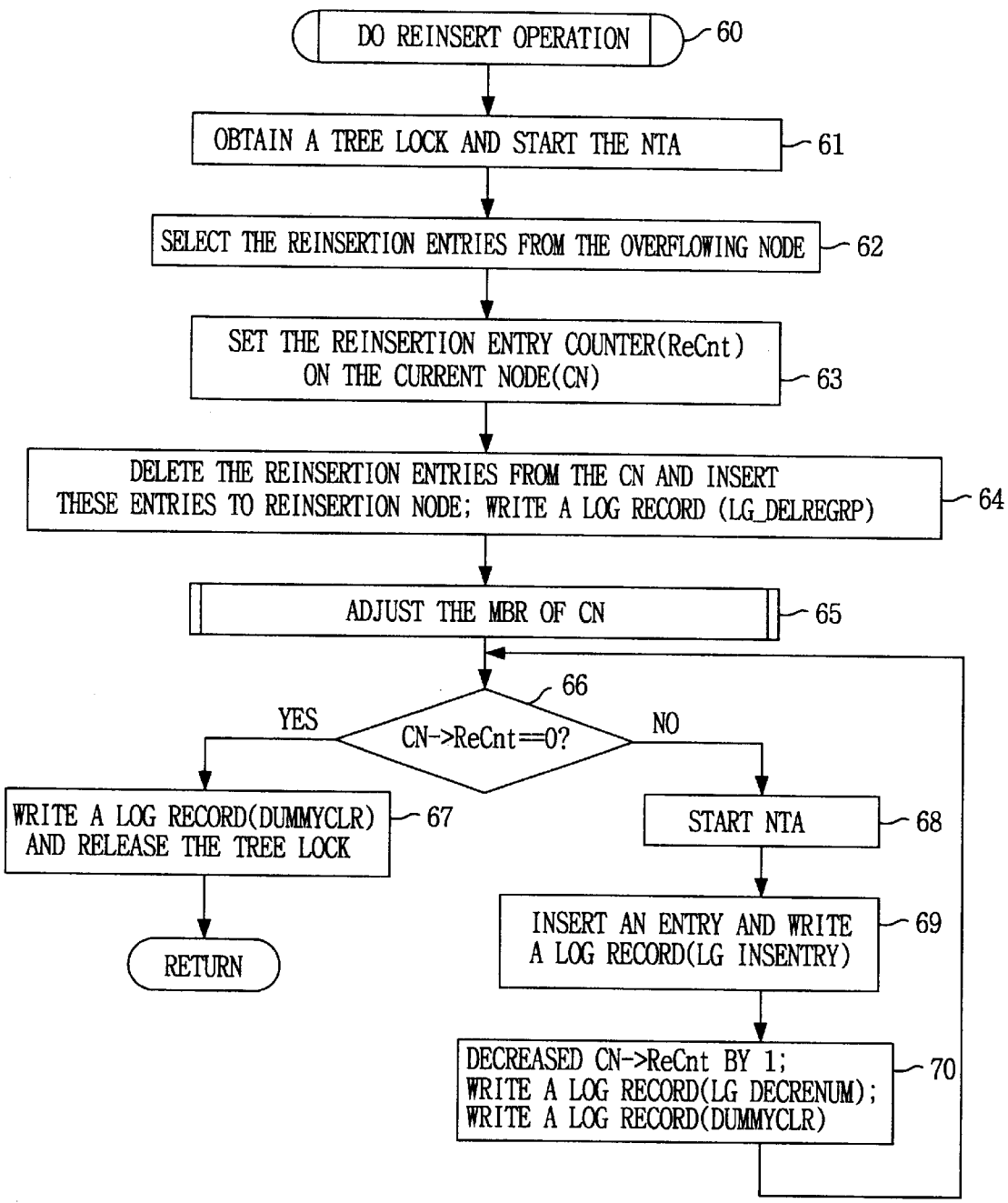
FIG. 4 is a flow chart showing a subroutine for reinsert operation of FIG. 2.

FIG. 4 is a flow chart showing a subroutine for reinsert operation of FIG. 2.

First, the tree lock is acquired, and then an NTA for whole reinsert operations is started at step 61. Then the entries to be reinserted are selected from the current node at step 62, and the number of the entries to be reinserted is recorded in the current node at step 63.

Further, the reinsertion entries are deleted from the current node, and these deleted entries are recorded to the reinsertion node. The log record (LG_DELREGRP) which has the information of deleted entries is written at step 64. Then the alteration of the MBR is reflected on the ancestor nodes at step 65, and then, a judgment is made as to whether the reinsert operation is terminated by checking whether the number of the reinsertion entry counter in the current node is equal to 0 at step 66.

If it is equal to 0, a dummyCLR is recorded to show that the whole reinsert operation has been completed. Then the locking of the tree is released at step 67.

On the other hand, if it is not equal to 0, then a new NTA is started for reinserting an entry at step 68, and then a reinsertion entry is inserted and a log record which has an information about entry insertion is written at step 69.

Further, the counter of the reinsertion entries of the current nodes is decreased by 1, and a log record (LG_ DECRENUM) for the decrement of the counter of the reinsertion entries of the current node is recorded. Then a dummyCLR is recorded to show that the insertion of a reinsertion entry has been completed at step 70. Then a judgment is made as to whether the counter of the reinsertion entries of the current nodes is equal to 0 at step 66.

Now the recovery method for a high dimensional index structure carrying out a reinsert operation according to the present invention will be described referring to FIGS. 5 and 6.

Figure 5:
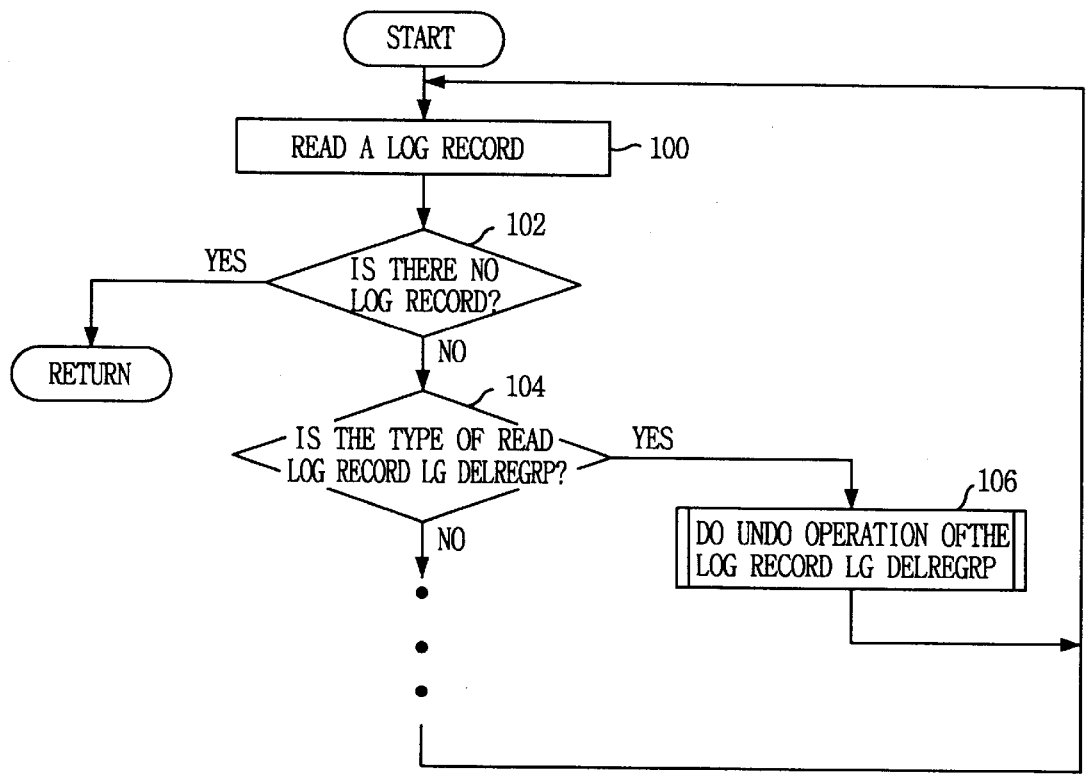
FIG. 5 is a flow chart showing the constitution of an embodiment of the recovery method for a high-dimensional index structure carrying out a reinsert operation according to the present invention.

FIG. 5 is a flow chart showing a recovery method for a high-dimensional index structure carrying out a reinsert operation according to one embodiment of the present invention.

First a log record is read out at step 100, and a judgment is made as to whether the read log record is actually present at step 102.

If the read log record is not actually present, which means that all the logs have been recovered, the operation is terminated. On the other hand, if there is the read log record, then a judgment is made as to whether the read log record is the log record (LG_DELREGRP) which was written when deleting the reinsertion entries which have been selected at the leaf or non-leaf node at step 104.

If it is positive, then the deletion of reinsertion entries is recovered at step 106. On the other hand, if the read log record is not the log record (LG_DELREGRP) which was written when deleting the reinsertion entries and has been selected at the leaf or non-leaf node, then the next log record is read out at step 100. Referring to FIG. 5, descriptions were made only on the log record LG_DELREGRP. However, it is also possible to recover a relevant log record.

Figure 6:
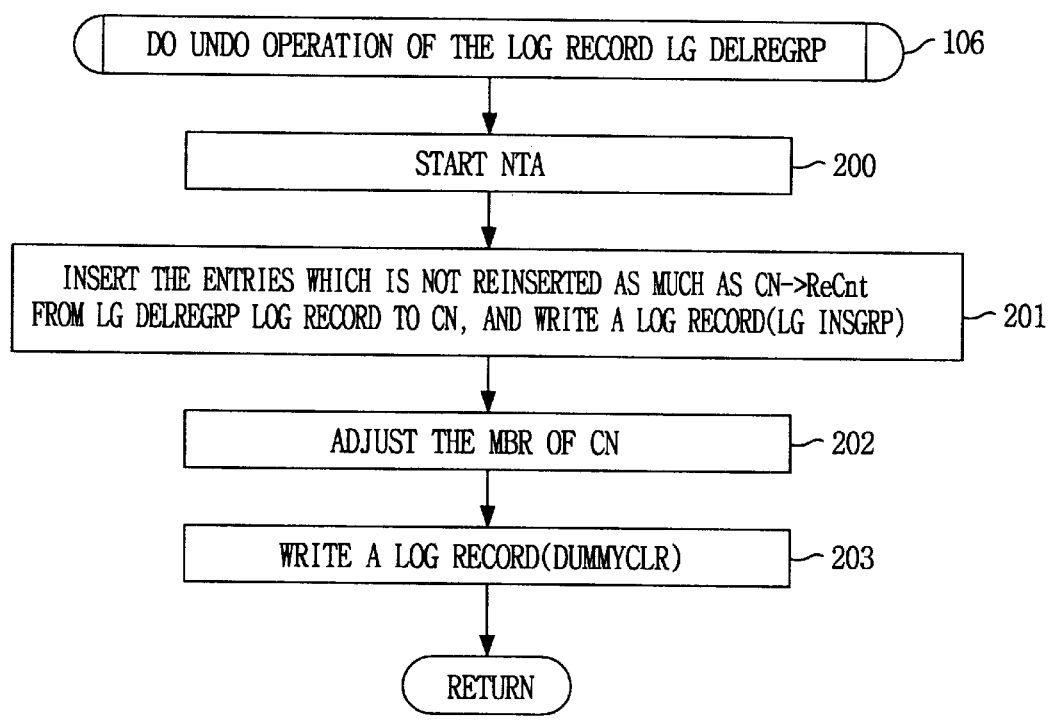
FIG. 6 is a flow chart showing a subroutine for recovering a deletion of reinsertion entries of FIG. 5.

FIG. 6 is a flow chart showing a subroutine for recovering a deletion of reinsertion entries of FIG. 5.

First, an NTA is started for recovering a deletion of reinsertion entries at step 200. Then the counter (ReCnt) of the remaining entries that are not reinserted is read. Then the remaining entries which are deleted for reinsert operation but not reinserted are inserted into the current node (CN), and a log record (LG_INSGRP) corresponding to an insertion of a part or whole of the deleted reinsertion entries to be reinserted is recorded at step 201.

Then after the insertion of the entries, the altered MBR is reflected on the ancestor nodes at step 202. Then a dummy-CLR is recorded to show that the recovering procedure of a deletion of reinsertion entries has been completed at step 203.

According to the present invention as described above, the log record analysis, the redo and the undo are carried out, and therefore, the alterations which are encountered during the reinsert operation can be efficiently carried out, as well as carrying out the restart rapidly. Further, owing to the rollback of the transactions which involve the reinsert operation, other transactions are minimally influenced.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for recovering a high-dimensional index structure employing a reinsert operation, comprising the steps of:

a) inserting an entry into a node, adjusting a MBR, processing an overflow, and storing a log record;

wherein the step a) includes the steps of:

c) traversing a tree to find a most suitable leaf node into which a new entry is to be inserted;

d) determining whether there is a sufficient space for inserting the new entry in the leaf node;

e) inserting a new entry if there is enough space, recording a log record and then, adjusting a MBR;

f) if there is no sufficient space, determining whether reinsert operation can be done; and g) if the reinsert operation can be done, performing a reinsert operation, and if not, splitting a relevant node; and b) recovering the log record stored.

2. The method as recited in claim 1, wherein the step e) includes the steps of:

e-1) inserting a new entry into a found node (current node);

e-2) determining whether the current node is a root node;

e-3) if the current node is a root node, carrying out a termination, and if not, accessing an upper node to alter the MBR of a relevant entry;

e-4) determining whether an index creation operation is being processed;

e-5) if the index creation operation is being processed, recording a log record having only redo information for modification of MBR;

e-6) if the index creation operation is not being processed, recording a log record having redo and undo information for modification of MBR;

e-7) determining whether the MBR of a parent node of a current node has been altered;

e-8) if the MBR of a parent node of a current node has been altered, assigning current node to parent node and returning to the step e-2); and e-9) if the determination result of the step e-7) is negative, terminating the process of adjusting MBR.

3. The method as recited in claim 1, wherein the reinsert operation of the step g) includes the steps of:

g-1) acquiring the tree lock, starting the NTA, selecting the entries to be reinserted from the current node and recording the number of the entries to be reinserted in the current node;

g-2) deleting the reinsertion entries from the current node, inserting these entry to the reinsertion node, recording a log record (LG-DELREGRP) which contains the information of deleted entries, reflecting an alteration of the MBR on ancestor nodes, and then determining whether the reinsert operation is terminated by checking the counter of the reinsertion entries of the current node being a predetermined number(0);

g-3) if the reinsert operation is terminated, writing a log record(DummyCLR) which shows that the whole reinsert operation has been completed, and releasing the tree lock;

g-4) if the reinsert operation is not terminated, starting an NTA for reinserting an entry, inserting and logging a reinsertion entry; and g-5) decreasing the counter of the reinsertion entries of the current node by 1, writing a log record(LG_DECRENUM) for the decrement of the counter of the reinsertion entries of the current node, and recording a log record(DummyCLR) to show that the insertion of a reinsertion entry has been completed, and then returning to the step g-2).

4. The method as recited in claim 1, wherein the step b) includes the steps of:

b-1) reading any one of a plurality of recorded log records, and judging as to whether the read log record is actually present;

b-2) if the read log record is not actually present, terminating an operation; and b-3) if there is present the read log record, doing a relevant recovering operation.

5. The method as recited in claim 4, wherein the step b-3) includes the steps of:

b-3-1) starting an NTA for recovering a deletion of the reinsertion entries;

b-3-2) reading the counter (ReCnt) of remaining entries which are not inserted from the current node (on which an undo is to be carried out), and inserting the remaining entries which are deleted for reinsert operation but not reinserted into the current node;

b-3-3) writing a log record (LG_INSGRP) which corresponds to an insertion of a part or whole of the deleted reinsertion entries to be reinserted; and b-3-4) reflecting the altered MBR on the ancestor nodes, and recording a log record to show that the recovering procedure of a deletion of reinsertion entries has been completed.

6. A computer readable and executable recording medium having a program for performing a method for recovering a high dimensional index structure, the method comprising the steps of:

a) inserting an entry into a node, adjusting a MBR, processing an overflow, and storing a log record;

wherein the step a) includes the steps of:

c) traversing a tree to find a most suitable leaf node into which a new entry is to be inserted;

d) determining whether there is a sufficient space for inserting the new entry in the leaf node;

e) inserting a new entry if there is enough space, recording a log record and then, adjusting a MBR;

f) if there is no sufficient space, determining whether reinsert operation can be done; and g) if the reinsert operation can be done, performing a reinsert operation, and if not, splitting a relevant node; and b) recovering the log record thus stored.

7. A method for recovering a high-dimensional index structure employing a reinsert operation, comprising the steps of:

a) inserting an entry into a node, adjusting a MBR, processing an overflow, and storing a log record;

b) recovering the log record stored;

c) reading any one of a plurality of recorded log records, and judging as to whether the read log record is actually present;

d) if the read log record is not actually present, terminating an operation; and e) if there is present the read log record, doing a relevant recovering operation.

8. The method as recited in claim 7, wherein the step e) includes the steps of:

e-1) starting an NTA for recovering a deletion of the reinsertion entries;

e-2) reading the counter (ReCnt) of remaining entries which are not inserted from the current node (on which an undo is to be carried out), and inserting the remaining entries which are deleted for reinsert operation but not reinserted into the current node;

e-3) writing a log record (LG_INSGRP) which corresponds to an insertion of a part or whole of the deleted reinsertion entries to be reinserted; and e-4) reflecting the altered MBR on the ancestor nodes, and recording a log record to show that the recovering procedure of a deletion of reinsertion entries has been completed.

* * * * *